US005617631A

United States Patent [19]

Nguyen

[11] Patent Number: 5,617,631

[45] Date of Patent: Apr. 8, 1997

[54] METHOD OF MAKING A LIQUID INK PRINTHEAD ORIFICE PLATE

[75] Inventor: Hung C. Nguyen, Webster, N.Y.

[73] Assignee: Xerox Corporation, Stamford, Conn.

[21] Appl. No.: 505,430

[22] Filed: Jul. 21, 1995

[51] Int. Cl.[6] .............................. B41J 2/16; G01D 15/18

[52] U.S. Cl. .............................. 29/890.1; 29/DIG. 37; 347/45; 347/47

[58] Field of Search .............................. 29/25.35, 890.1, 29/DIG. 37, DIG. 12; 347/45–47, 63, 76; 451/288

[56] References Cited

U.S. PATENT DOCUMENTS

| | | | |
|---|---|---|---|
| 3,615,955 | 10/1971 | Regh | 451/288 X |
| 4,277,548 | 7/1981 | Vedder | 347/76 |
| 4,429,322 | 1/1984 | Dressler et al. | 347/47 |
| 4,809,428 | 3/1989 | Ader et al. | 347/63 X |
| 4,829,319 | 5/1989 | Chan et al. | 347/47 |
| 4,972,204 | 11/1990 | Sexton | 346/75 |
| 5,016,023 | 5/1991 | Chan et al. | 29/890.1 X |
| 5,218,754 | 6/1993 | Rangappan | 29/890.1 X |
| 5,255,017 | 10/1993 | Lam | 346/140 |
| 5,434,606 | 7/1995 | Hindagolla et al. | 347/45 |

FOREIGN PATENT DOCUMENTS

| | | | |
|---|---|---|---|
| 3184869 | 8/1991 | Japan | 29/890.1 |
| 4341859 | 11/1992 | Japan | 29/890.1 |
| 5254131 | 10/1993 | Japan | 29/890.1 |
| 5278219 | 10/1993 | Japan | 29/890.1 |

OTHER PUBLICATIONS

Gardner, William R., "Process for Fabrication of Ink Jet Orifices," *Xerox Disclosure Journal,* vol. 4, No. 2, Mar./Apr. 1979, pp. 251–252.

Herbert, William G. & Altavela, Robert P. "Bi Laminar Ink Jet Aperture Plate Formation", *Xerox Disclosure Journal,* vol. 6, No. 3, May/Jun. 1981, pp. 119–120.

*Primary Examiner*—Peter Vo
*Attorney, Agent, or Firm*—Daniel J. Krieger

[57] ABSTRACT

A method for fabricating a liquid ink printhead orifice plate for use in a liquid ink printhead and printer. The liquid ink orifice plate is formed of a thermal plastic resin which is stamped between an orifice plate mandrel which includes the ink carrying features and a flat mandrel. Once the orifice plate has been stamped, excess material is removed from the orifice plate to reveal ink carrying features of the stamped orifice plate. The orifice plate mandrel is formed by electroforming a mandrel on an etched silicon wafer which defines a plurality of ink carrying channels and ink reservoirs. The electroform mandrel can be made of any number of metals which includes nickel.

17 Claims, 6 Drawing Sheets

METHOD OF MAKING A LIQUID INK PRINTHEAD ORIFICE PLATE

FIELD OF THE INVENTION

This invention relates generally to liquid ink printheads and more particularly to a method for fabricating an orifice plate for thermal ink jet printheads by electroforming and thermal plastic stamping techniques.

BACKGROUND OF THE INVENTION

Liquid ink printers of the type frequently referred to as continuous stream or as drop-on-demand, such as piezoelectric, acoustic, phase change wax-based, or thermal, have at least one printhead from which droplets of ink are directed towards a recording sheet. Within the printhead, the ink is contained in a plurality of channels. Power pulses cause the droplets of ink to be expelled as required from orifices or nozzles at the end of the channels. Continuous ink stream printers are also known.

In a thermal ink-jet printer, the power pulses are usually produced by a thermal transducer component, such as a resistor, each located in a respective one of the channels, which are individually addressable to heat and vaporize ink in the channels. As voltage is applied across a selected resistor, a vapor bubble grows in that particular channel and ink bulges from the channel orifice. At that stage, the bubble begins to collapse. The ink within the channel retracts and separates from the bulging ink thereby forming a droplet moving in a direction away from the channel orifice and towards the recording medium whereupon hitting the recording medium a spot is formed. The channel is then refilled by capillary action, which, in turn, draws ink from a supply container of liquid ink. Operation of a thermal ink-jet printer is described in, for example, U.S. Pat. No. 4,849,774.

The ink-jet printhead may be incorporated into either a carriage-type printer or a page-width type printer. The carriage-type printer typically has a relatively small printhead containing the ink channels and nozzles. The printhead can be sealingly attached to a disposable ink supply cartridge and the combined printhead and cartridge assembly is attached to a carriage which is reciprocated to print one swath of information (equal to the length of a column of nozzles), at a time, on a stationary recording medium, such as paper or a transparency. After the swath is printed, the paper is stepped a distance equal to the height of the printed swath or a portion thereof, so that the next printed swath is contiguous or overlapping therewith. The procedure is repeated until the entire page is printed. In contrast, the page-width printer includes a stationary printhead having a length sufficient to print across the width or length of a sheet of recording medium. The paper is continually moved past the page-width printhead in a direction substantially normal to the printhead length and at a constant or varying speed during the printing process. A page-width ink-jet printer is described, for instance, in U.S. Pat. No. 5,192,959.

A typical ink jet printhead for use in an ink jet printer includes an ink flow directing component or orifice plate, such as an etched silicon substrate containing a linear array of channels open at one end in communication with a common ink reservoir and a logic and thermal transducer component, also known as a heater plate, which includes, for example, a linear array of individual heating elements, usually resistors, monolithically integrated logic drivers, and control circuitry. The orifice plate is aligned with and mated to the heater plate with one resistor aligned with each channel and located at a predetermined distance from the channel open end. The channel open ends serve as the droplet ejectors, expelling channels, or nozzles. Power MOS drivers immediately next to and integrated on the same substrate as the array of resistors are driven by the control circuitry, also integrated on the same substrate, that selectively enable the drivers which apply current pulses to the resistors.

One known method of fabricating thermal ink jet printheads is to form a plurality of the ink flow directing components and a plurality of logic, driver, and thermal transducer components on respective silicon wafers, and then aligning and bonding the wafers together, followed by a process for separating the wafers into a plurality of individual printheads, such as by dicing. The individual printheads are used in one common design of printer in which the printhead is moved periodically across a sheet of paper to form the printed image, much like a typewriter. Individual printheads can also be butted together side by side, placed on a supporting substrate, aligned, and permanently fixed in position to form a large array thermal ink jet printhead or a page width array printhead.

While orifice plates of silicon wafers can provide good printing density and accurate printing of images, silicon is an expensive material and must be etched to create the ink carrying features, such as channels and ink reservoirs. The etching process is a fairly tedious process and is quite costly when considering that the channel plate has no active components but merely provides a physical structure for carrying ink past the heater for ejection from the channels. In addition, etching of a silicon wafer is a complicated process which includes relying on the introduction of chemicals to form the ink carrying features. Consequently, while silicon orifice plates provide meet design requirements, less costly and consistently reproducible orifice plates are desired.

Various liquid ink printheads, including orifice plates, and methods of fabrication therefor are illustrated and described in the following disclosures which may be relevant to certain aspects of the present invention.

In U.S. Pat. No. 4,972,204 to Sexton, an orifice plate for use in ink-jet printing is described. The orifice plate includes a first elongated lamina composed of electroformed metal or metal alloy having tensile or compressive stress condition and a second elongated lamina composed of a metal or metal-alloy electroformed onto the first lamina and having a counterbalancing stress condition.

U.S. Pat. No. 5,218,754, to Rangappan, describes a thermal ink-jet printhead designed to have a length equivalent to the width of a page. A channel plate is made on a single piece of desired length by molding any material that can be molded. Subsequently, the channel plate is hardened to form a rigid structure.

U.S. Pat. No. 5,255,017 to Lam describes a process of forming a mandrel for manufacturing ink-jet orifice plates. The mandrel includes a substrate, a pattern of electrically conductive surfaces on the substrate and an oxide layer on the pattern of conductive surfaces for reducing adhesion of an electroplated film to the pattern of conductive surfaces. The mandrel is used for electroforming an ink-jet orifice plate.

Xerox Disclosure Journal, Vol. 4, No. 2, March/April 1979, entitled "Process For Fabrication of Ink-Jet Orifices" describes a method for forming a large number of closely spaced accurately defined orifices in a metal plate. A pattern of raised, hardened resist posts are developed on a conductive substrate. The area between the posts is filled with metal by electroforming. The electroformed metal is stripped off the conductive substrate to create the orifice plate.

Xerox Disclosure Journal, Vol. 6, No. 3, May/June 1981, entitled "Bi-Laminar Ink-Jet Aperture Plate Formation", describes nickel electroforming of ink-jet aperture plates. The ink-jet aperture plate is strengthened by placing another layer over the original layer while preventing metal deposition immediately adjacent the previously formed apertures.

SUMMARY OF THE INVENTION

In accordance with one aspect of the present invention, there is provided a method of fabricating an orifice plate for an ink-jet printhead. The method of fabrication includes the steps of stamping a stampable material to provide a stamped orifice plate, and removing a portion of the stamped orifice plate to reveal ink carrying features thereof.

Other features of the present invention will become apparent as the following description proceeds and upon reference to the drawings, in which:

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Liquid ink printers include thermal ink jet printers such as the scanning carriage type of printer described in U.S. Pat. No. Re. 32,572 to Hawkins et al., incorporated herein by reference, or pagewidth type thermal ink-jet printers such as described in U.S. Pat. No. 5,192,959. Partial width array thermal ink jet printers are also known. In each type of these thermal ink-jet printers, the printing mechanism can include one or more printhead elements each typically comprised of a channel element and a heater element mated together. Both the channel element and the heater element can be made from silicon formed as a wafer upon which either the ink carrying features of the channel element are defined or the logic, driver, and thermal transducer components are formed. In the case of a scanning type ink-jet printer, a single printhead element may be used for depositing ink on the recording medium or in the case of a pagewidth type ink-jet printer a number of printhead elements may be used to form a pagewidth printbar.

Figure 1:
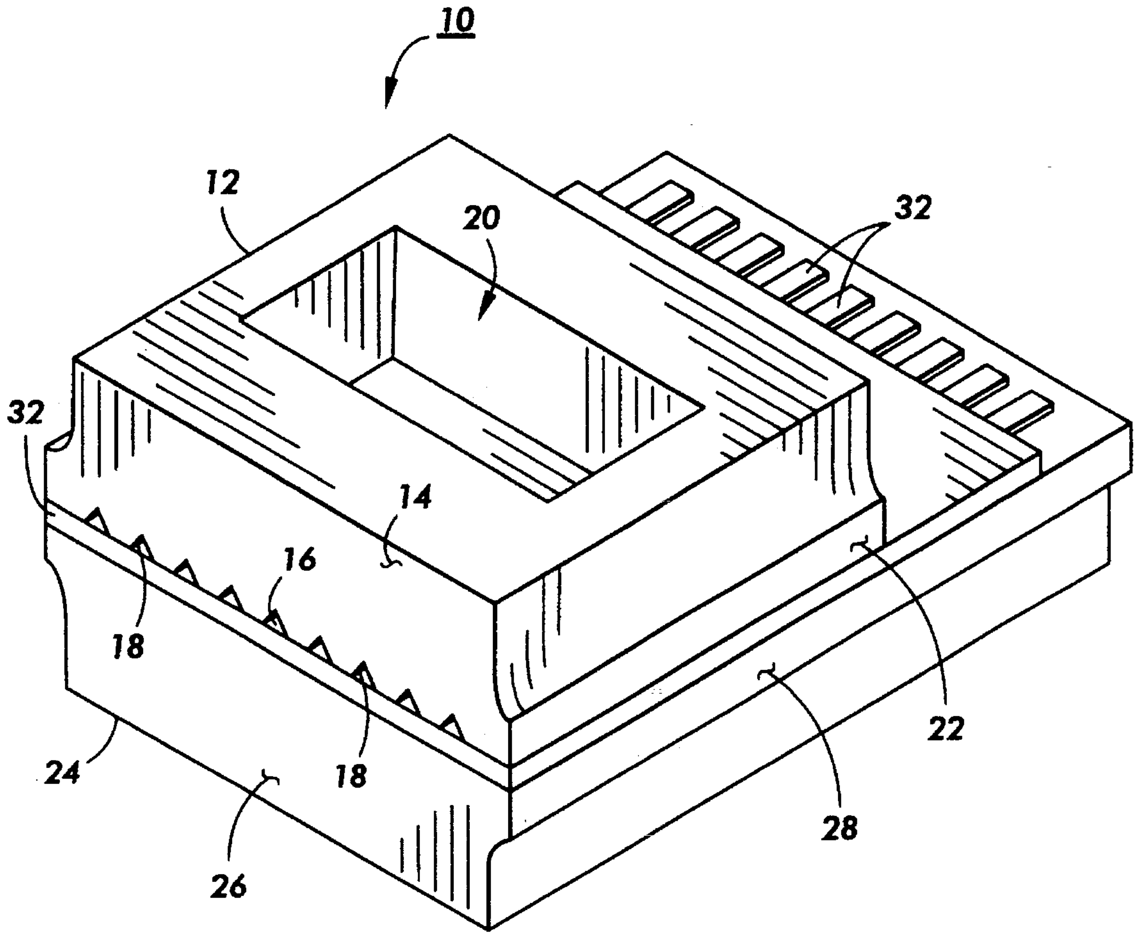
FIG. 1 PRIOR ART
FIG. 1 is a schematic elevational view of a prior art ink-jet printhead element for use in an ink-jet printer.

In the case of a printhead element having a channel element made of silicon, the ink carrying feature, such as the ink channels and ink reservoirs, are typically created on the surface of a silicon wafer with orientation dependent etching or anisotropic etching. One such prior art thermal ink-jet printhead element is illustrated in FIG. 1, where an ink-jet printhead element 10 includes a channel element 12 having arranged in side by side relationship along a front face 14, a plurality of ink ejectors or channels 16 terminating in nozzles 18. The channel element 12 also includes an ink reservoir or ink fill hole 20 which allows for ink to fill the channels 16 through capillary action for later deposition upon a recording medium, such as a sheet of paper or a transparency. In addition, the channel element 12 might include a butting edge 22 which intersects the front face 14. In a page width array, the butting edge 22 would contact a butting edge of an adjacent printhead element.

Located adjacent to and below the channel element 12 is a lower electrical substrate or heater element 24 having a second front face 26 intersecting a butting edge 28. The heater element 24 includes a plurality of individual heaters (not shown) which are patterned on the silicon substrate in a side by side relationship so that each individual heater will be strategically associated with one of the channels 16 when the heater element 24 is mated to the channel element 12. The heater element 24 includes electronic circuitry for driving the individual heaters which consists of, for example, semi-conductor drivers driven by logic circuitry. The logic circuitry is, in turn, connected to a plurality of electrode terminals 32 which receive signals from the electronic subsystem of an ink-jet printer. A thick film insulating layer 32 is deposited on top of the circuitry of the heater element 24. The thick film insulating layer 32 is a passivation layer sandwiched between the upper and lower substrates. The passivation layer 32 provides protection for the electronic circuitry due to mobile ions and any deleterious effects of inks.

Figure 2:
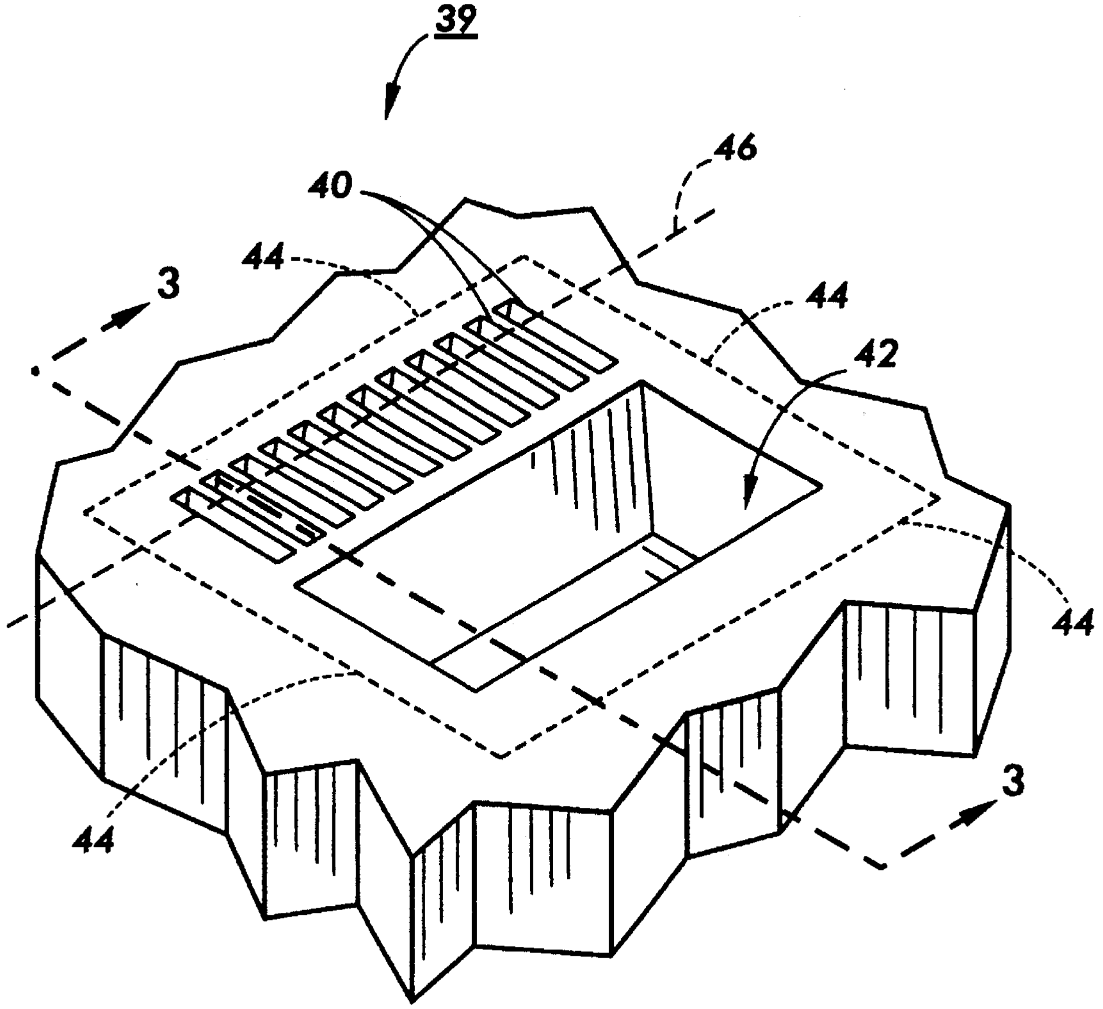
FIG. 2 is a schematic fragmentary elevational view of a single channel element for use in an ink-jet printhead.
Figure 4:
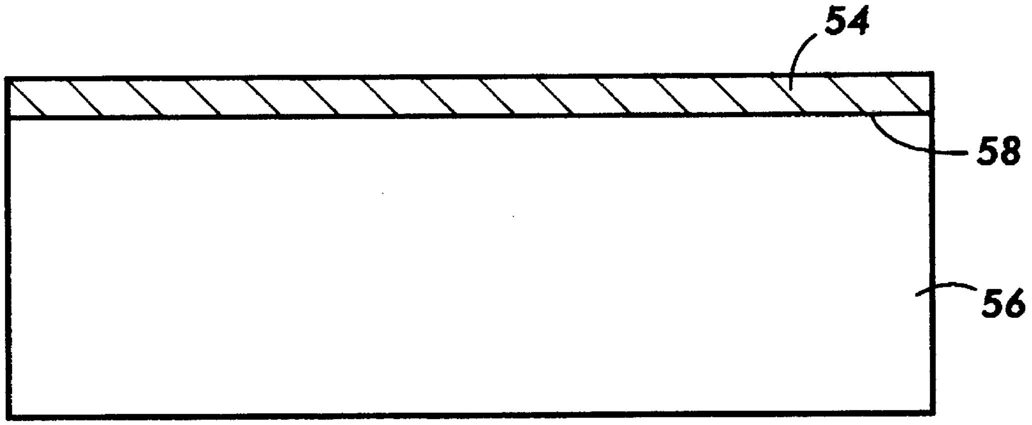
FIG. 4 is a schematic side view of a substantially planar second mandrel formed by an electroforming process on a silicon wafer.

The channel element 12 is one of many channel elements which are formed on, for example, a silicon wafer such as described in FIG. 4A of U.S. Pat. No. 5,410,340, to Drake et al., herein incorporated by reference. The ink carrying features of the channel element 12 which includes the channels 16 and the ink reservoir 20 can be formed on a two-sided (100) silicon wafer 39, a portion of which is illustrated in FIG. 2. After the silicon wafer is chemically cleaned, a silicon nitride layer, is deposited on both sides thereof. The channel wafer is then photolithographically patterned to form a plurality of channel grooves 40 and one or more fill holes 42. The single channel element of the silicon wafer is later separated from adjoining channel elements to form the printhead element 10 as illustrated in FIG. 1.

Once the silicon wafer has been properly etched, each of the individual channel elements are separated from an adjacent channel element along the separation lines 44. It is also possible, to make a separation cut along the line 46 at this stage of the process, or at a later stage of the process, to thereby open the channels and form the ink-ejecting orifice or nozzles of the channel element 12.

While the etching of a number of channel elements on a silicon wafer provides for the large scale production of channel elements for creating printhead elements, the process for making the channel wafers includes the use of chemicals and a period of time for the chemicals to properly form the individual channels and the ink carrying reservoirs. This process is not a simple one and the possibility of defects exists, since the etching process must be consistently and accurately applied to the entire silicon wafer. The present invention, however, is directed to using one of the etched silicon channel wafers, to produce plastic channel elements which can be manufactured more quickly than the individually etched silicon wafers and which can also be manufactured at a substantially reduced cost.

To produce a plastic channel element of the present invention, a master mandrel formed by an electroforming process is used to create a master stamper. The master stamper is subsequently used in a thermal plastic stamping process to produce a plastic channel wafer. The plastic channel wafer, after further refinement, is a direct replacement for the etched silicon channel wafers now used. By electroforming a stamping mandrel and using thermal plastic stamping techniques, the production of a channel wafer is simplified, thereby reducing costs due not only to the reduced production time, but also due to the fact that thermal setting plastics are a substantially cheaper material than silicon.

The fabrication of the plastic channel element of the present invention includes using the previously described silicon wafer patterned and etched with channels and ink reservoirs as illustrated in FIG. 2. Once the etched silicon wafer has been properly formed, the surface of the silicon wafer bearing the ink carrying features is plated or sprayed with a metal, such as gold or silver, to a thickness of 100 to 300 Angstroms. The plated silicon wafer is then electroformed with nickel or other known and appropriate metals.

Figure 3:
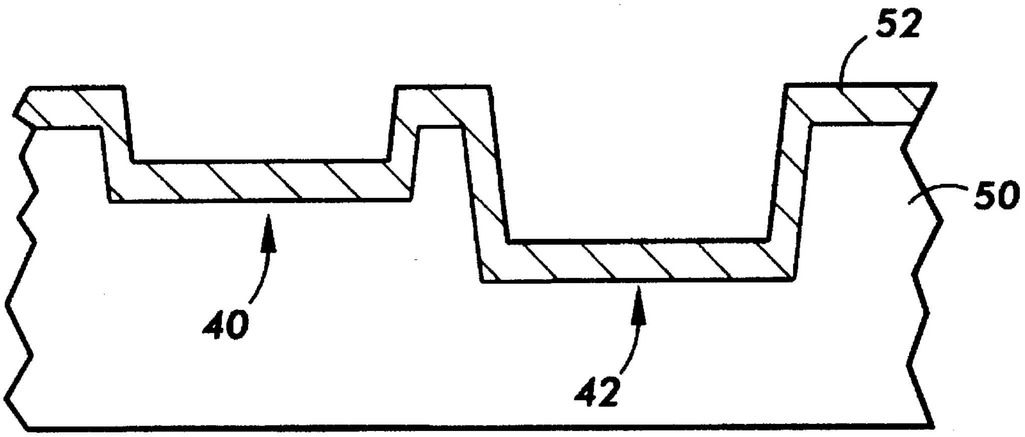
FIG. 3 is a schematic cross-sectional view of the channel element along a line 3—3 of FIG. 2 showing the electroforming of a first mandrel.

A portion 50 of the silicon wafer 39 bearing the channel 40 and the ink reservoir 42 is illustrated in FIG. 3 along a line 3—3 of FIG. 2. Electroforming the silicon substrate 50 to form an electroformed layer 52 can be done by any known method. Any suitable metal capable of being deposited by electroforming may be used in the process of this invention. While nickel is preferred, other metals that may be electroformed include copper, cobalt, iron, silver, gold, lead, zinc, aluminum, tin, rubindium, uranium, pladium, and the like, and alloys thereof such as brass and bronze. When such metals are employed, the separation of the silicon wafer from the mandrel can be effected by heating the mandrel or cooling the silicon wafer. Electroforming under conditions that impart tensile stress to the electroformed mandrel can also assist in separation. Prior to electroforming, however, the silicon wafer 50 can be treated with a release agent such that once the electroformed layer or mandrel 52 has been formed, the electroformed layer 52 can also be removed easily from the silicon wafer 50. If a nickel electroformed mandrel is created, the thickness thereof should be approximately from 10–15 mils thick and is preferably approximately 12 mils.

In addition to forming the nickel electroformed mandrel 52, a second mandrel 54 (see FIG. 4) is formed on a non-patterned silicon wafer 56 using the previously described method. The second mandrel 54, formed thereby, includes at least one substantially planar or flat surface 58. Other methods can also be used to form the second nickel mandrel 54, such as machining a substantially flat surface to a metal blank. Any method which provides a substantially flat surface void of any geometrical formations or structures can be used.

Figure 5:
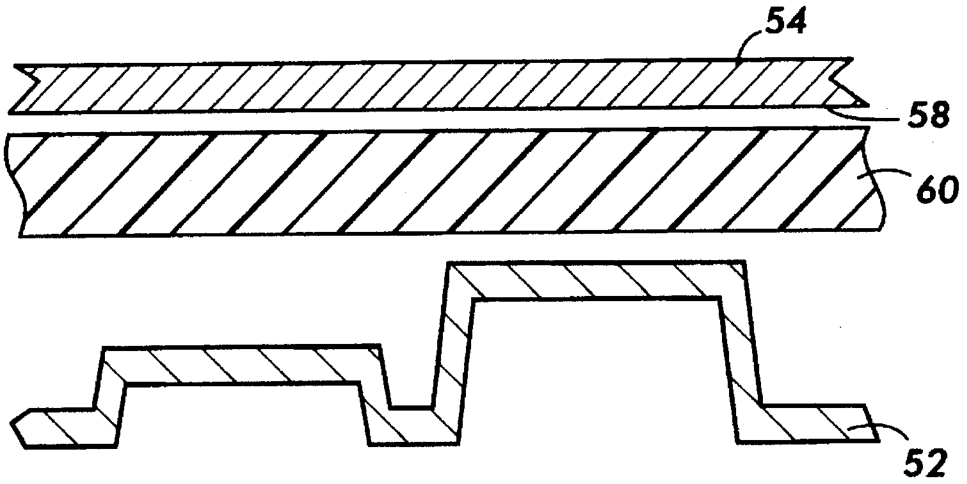
FIG. 5 illustrates a thermal plastic blank located between the first mandrel and the second mandrel ready for stamping.
Figure 6:
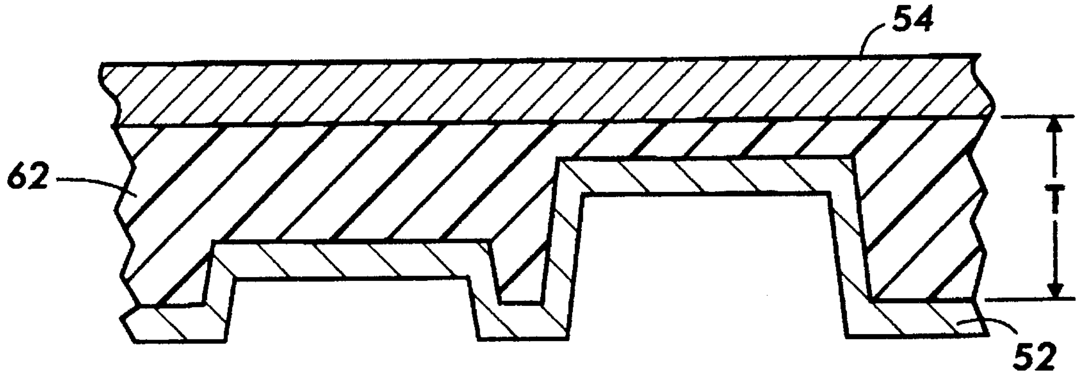
FIG. 6 illustrates a schematic representation of the structure of the thermal plastic blank during compression between the first mandrel and the second mandrel.
Figure 7A:
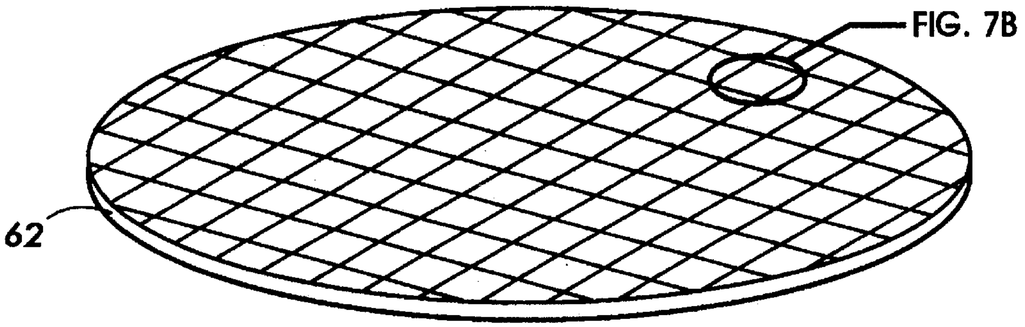
FIG. 7 illustrates a plurality of thermal plastic orifice plate elements resident on a large thermal plastic wafer after stamping and an exploded view of one of the orifice plate elements.
Figure 7B:
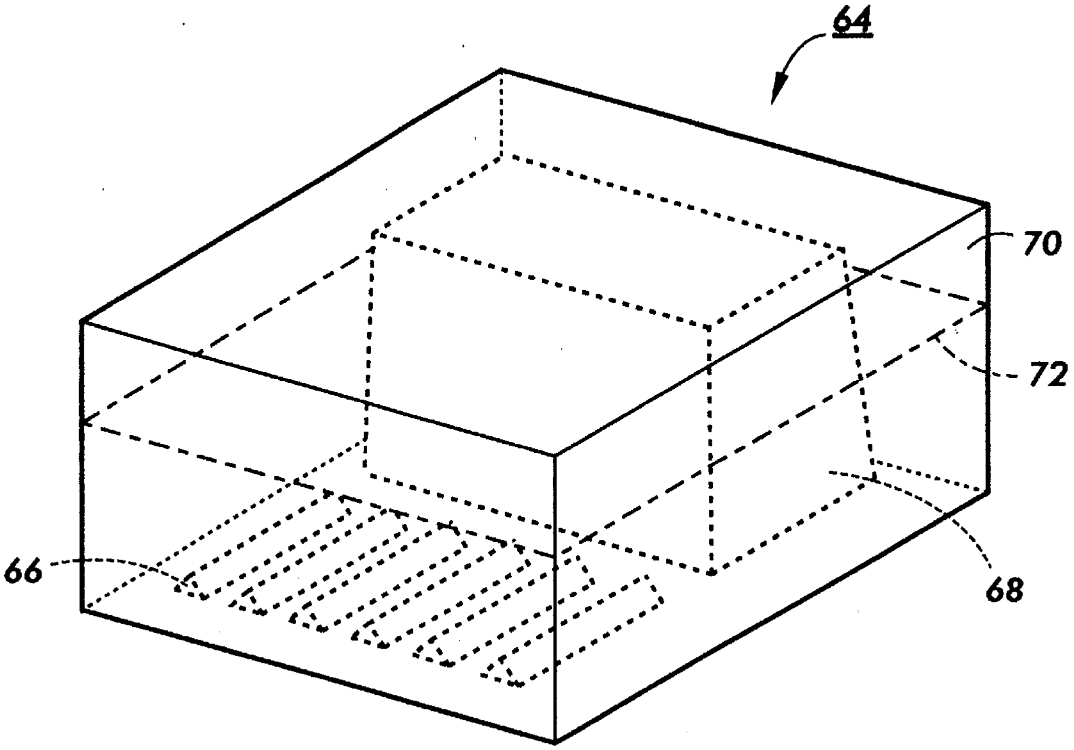

After forming each of the nickel electroformed mandrels 52 and 54, the mandrels 52 and 54 are removed from the respective silicon wafers used for the creation thereof. Once removed, a plastic channel/reservoir plate can be created as illustrated in FIGS. 5, 6, and 7. In FIG. 5, a stampable material 60, such as a thermal plastic resin sheet, is placed between the mandrel 52 and the mandrel 54 for stamping. The thermal plastic resin sheet 60 is preferably made of a thermal plastic and thermal setting resin which can include materials like polyurethane, polyvinyl acetate and mylar. The thermal plastic resin sheet is stamped between the mandrel 52 and the mandrel 54 using a stamping pressure and a stamping temperature appropriate for the particular thermal plastic material being utilized. In one representative stamping operation, a stamping pressure of 2,000 pounds per square inch was applied. The heat was applied through the use of heated first and second mandrels. It is, of course, possible to use a number combinations of pressure and heat wherein the amount of heat and pressure selected is based on the type of material being used, the thickness of the blank material and other factors known to those skilled in the art. In the present invention, it has been found that when forming a mandrel of nickel, geometries or ink carrying features having a tolerance of one to three micrometers can be achieved.

Figure 8:
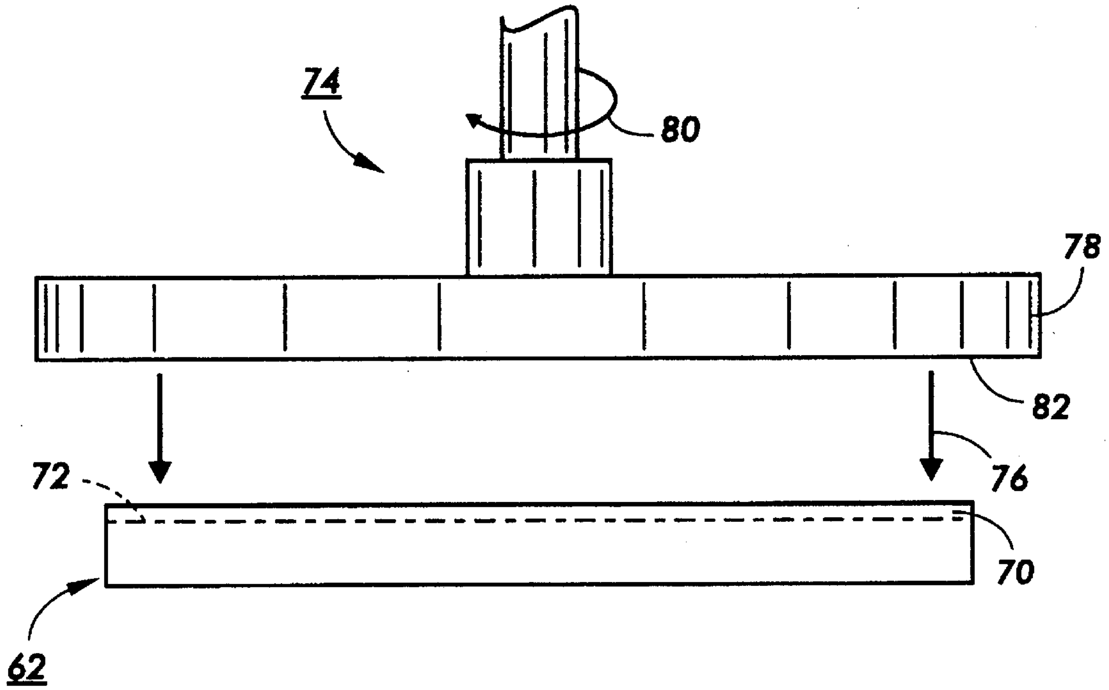
FIG. 8 illustrates a schematic side view of a removal process for removing a predetermined amount of material from one of the surfaces of the orifice wafer.

As illustrated in FIG. 6, FIG. 7, and FIG. 8, upon removal of the mandrels 52 and 54, the completion of the stamping process yields a plastic channel wafer 62, which has been formed between the two mandrels, having the necessary ink carrying features. The thickness T of the plastic channel wafer 62 is preferably around 30 mils.

A single channel element 64 of the plastic channel wafer 62 is illustrated in FIG. 7. The single channel element 64 defines a plurality of ink carrying features which include a plurality of channels 66 and an ink reservoir 68 which correspond to the channels 18 and the ink carrying reservoir 20 of the printhead 10. The single channel element, after undergoing further refinement, functions like the silicon channel element 12 having channels 18 and the ink carrying reservoir 20 of FIG. 1. As can be seen in FIG. 7, a top portion 70 of the plastic channel wafer 62 prevents the ink carrying reservoir 68 from receiving ink since the ink carrying reservoir 68 does not include an ink opening. To create an ink opening for the ink to pass to the channels, a removal process is used to reveal an ink feed slot by removing the top portion 70 up to a location indicated by the line 72.

The removal process, for example, a lapping process, as illustrated in FIG. 8, includes the use of a lapping or polishing apparatus 74 which is moved in the direction of the arrows 76 until contact is made with the plastic channel wafer 62. The lapping apparatus 74 includes a lapping wheel 78 which rotates in a direction 80 and includes an abrasive, suitable for abrading plastic, on a contacting surface 82 thereof. The lapping apparatus 74 descends upon the plastic channel wafer 62 and removes the top portion 70 up to the line 72 thereby revealing ink feed slots of each ink reservoir resident in each of the channel elements in the plastic channel wafer 62. It is preferred that approximately one-third of the total thickness T of the plastic channel wafer is removed, such that for the present embodiment, a completed plastic channel wafer will have a thickness of approximately twenty mils.

The completed plastic channel wafer 62 is now substantially similar in function to the silicon channel wafers of the prior art. At this point in the fabrication, known methods of dicing silicon wafers to create individual channel elements can be applied to form individual plastic channel elements. Once the individual plastic channel elements have been formed, a printhead element 84 having a plastic channel element 86 is mated with one of the previously described heater elements 24 as illustrated in FIG. 9.

Figure 9:
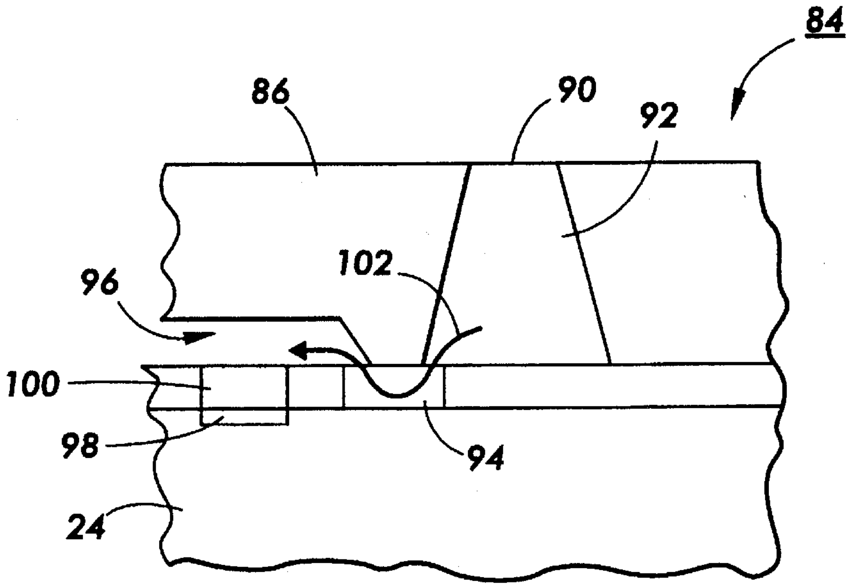
FIG. 9 illustrates a schematic cross-sectional side view of a portion of a thermal ink jet printhead illustrating a plastic channel element mated to a heater element.

In the FIG. 9 schematic side elevational view of the printhead 84, the flow of ink through the printhead element can be seen. Ink is introduced through an ink feed slot 90, previously revealed by the removal process, and remains in an ink reservoir 92, an ink pit 94, and a channel 96 until a printing command is received by a heater 98. The heater 98 is located beneath a heater pit 100 where ink also resides. At the initiation of the printing signal, the heater 98 energizes and begins to vaporize the ink which is contained within and above the heater pit 100. A vapor bubble is created which ejects a certain amount of ink from the nozzle defined by the channel element 86 as has been previously described. Once the ink is ejected from the channel 96, ink flows in the direction of the arrow 102 by capillary action refilling the channel 96, and heater pit 100 for subsequent ejection of ink.

In recapitulation, a liquid ink printhead orifice plate and fabrication therefore has been described. It is, therefore, apparent that there has been provided in accordance with the present invention, a method for fabricating not only individual channel elements made of thermal setting plastic for individual printheads but also a method for creating orifice plates manufactured from plastic that fully satisfies the aim and advantages herein before set forth. While this invention has been described in conjunction with a specific embodiment thereof, it is evident that many alternatives, modifications, and variations will be apparent to those skilled in the art. For instance, the number of channels per inch does not appear to be limited by the material capabilities of the thermal setting plastic, but is instead potentially limited by the material and etching limitations of the silicon wafer. For instance, it is possible that a density of 300 channels per inch, 600 channels per inch or an even greater density can be achieved as long as these densities can be etched upon a silicon wafer. The present invention also includes the creation of larger channel elements than described herein. For instance, it is possible than instead of defining on the silicon plate a number of individual silicon channel elements each which are separated and mated with an individual heater element, the silicon wafer could be etched to create a channel element having a longer length which would cooperate with a plurality of heater elements placed side by side. Accordingly, it is intended to embrace all such alternatives, modifications and variations that fall within the spirit and broad scope of the appended claims.

What is claimed is:

1. A method of fabricating a channel plate for use in an ink jet printhead, comprising:

providing a silicon wafer and a stampable material;

forming a channel plate mandrel on said silicone wafer, said plate mandrel including features corresponding to ink carrying features to be formed on the stampable material;

stamping the stampable material with said plate mandrel, thereby forming a stamped channel plate including the ink carrying features, and removing a portion of the stamped channel plate to reveal the ink carrying features thereof.

2. The method of claim 1, wherein said forming step comprises electroforming the silicon wafer to form the channel plate mandrel.

3. The method of claim 2, further comprising placing the stampable material between the channel plate mandrel and a second mandrel before said stamping step.

4. The method of claim 3, wherein said placing step comprises selecting the second mandrel as having a substantially flat surface.

5. The method of claim 4, wherein said forming step comprises electroforming the silicon wafer with nickel to form the channel plate mandrel.

6. The method of claim 5, wherein said placing step comprises selecting the second mandrel as being made from nickel.

7. The method of claim 1, further comprising the step of heating the stampable material during said stamping step.

8. The method of claim 7, wherein said stamping step comprises stamping the stampable material with a pressure of approximately 2000 pounds per square inch.

9. The method of claim 8, further comprising selecting the stampable material as being made from a thermoplastic resin.

10. The method of claim 9, wherein said selecting step selects a polyurethane material for the stampable material.

11. The method of claim 9, wherein said selecting step selects a polyvinyl acetate material for the stampable material.

12. The method of claim 9, wherein said selecting step selects a mylar material for the stampable material.

13. The method of claim 1, wherein said stamping step forms an ink reservoir as one of the ink carrying features of the stamped channel plate.

14. The method of claim 13, wherein said removing step comprises lapping the stamped channel plate to reveal an ink feed slot in communication with the ink reservoir.

15. The method of claim 1, wherein said forming step comprises forming the channel plate mandrel from a silicon wafer including ink carrying features having a spacing of at least 300 ink carrying features per inch.

16. The method of claim 1, wherein said stamping step comprises stamping a stampable material with the channel plate mandrel to form a stamped orifice plate having a thickness of approximately 30 mils.

17. The method of claim 16, wherein said removing step comprises removing a portion having a thickness of approximately 10 mils to reveal the ink carrying features thereof.

* * * * *